United States Patent [19]
Behr et al.

[11] Patent Number: 5,104,677
[45] Date of Patent: Apr. 14, 1992

[54] LIQUID NUTRITIONAL PRODUCT

[75] Inventors: Stephen R. Behr, Westerville; Lisa D. Craig, Columbus; Keith A. Garleb, Powell; Cynthia S. Neal, Columbus; James N. Chmura, Pickerington; Paul S. Anloague, Columbus; Mary B. Cunningham; David C. Sertl, both of Westerville, all of Ohio

[73] Assignee: Abbott Laboratories, Abbott Park, Ill.

[21] Appl. No.: 722,439

[22] Filed: Jun. 27, 1991

[51] Int. Cl.$^5$ .................................. A23L 2/38
[52] U.S. Cl. .................................. 426/590; 426/482; 426/573; 426/804; 424/439; 514/53; 514/951; 514/965
[58] Field of Search .................. 426/804, 93, 482

[56] References Cited

U.S. PATENT DOCUMENTS

| | | | |
|---|---|---|---|
| 4,089,981 | 5/1978 | Richardson | 426/577 |
| 4,143,163 | 3/1979 | Hutcheson | 426/804 |
| 4,156,021 | 5/1979 | Richardson | 426/577 |
| 4,348,379 | 9/1982 | Kowalsky | 426/804 |
| 4,401,682 | 8/1983 | Battista | 426/804 |
| 4,528,205 | 7/1985 | Turrisi | 426/804 |
| 4,565,702 | 1/1986 | Morley et al. | 426/93 |
| 4,619,831 | 10/1986 | Sharma | 426/804 |
| 4,680,189 | 7/1987 | Schumacher | 426/804 |
| 4,698,232 | 10/1987 | Sheu | 426/804 |
| 4,710,390 | 12/1987 | Schumacher | 426/804 |
| 4,747,881 | 5/1988 | Shaw | 426/577 |
| 4,766,004 | 8/1988 | Moskowitz | 426/613 |
| 4,774,098 | 9/1988 | Gould | 426/573 |
| 4,774,099 | 9/1988 | Feeney | 426/804 |
| 4,784,861 | 11/1988 | Gori | 426/804 |
| 4,790,991 | 12/1988 | Shaw | 426/74 |
| 4,806,475 | 2/1989 | Gould | 435/165 |
| 4,818,539 | 4/1989 | Shaw | 426/74 |
| 4,851,392 | 7/1989 | Shaw | 426/658 |
| 4,854,990 | 5/1989 | Amer | 426/804 |
| 4,877,627 | 10/1989 | Leitz | 426/804 |
| 4,915,960 | 4/1990 | Holmgren | 426/804 |
| 4,923,981 | 5/1990 | Weibel | 426/602 |
| 4,927,649 | 5/1990 | Antenucci | 426/804 |
| 4,959,227 | 9/1990 | Amer | 426/35 |
| 4,971,810 | 11/1990 | Hoyda | 426/583 |
| 4,976,982 | 12/1990 | Gillmore | 426/804 |
| 4,983,405 | 1/1991 | Cherukuri | 426/804 |
| 4,994,115 | 2/1991 | Giesfeldt | 426/482 |
| 4,996,063 | 2/1991 | Inglett | 426/804 |
| 5,024,996 | 6/1991 | Ringe | 426/804 |

FOREIGN PATENT DOCUMENTS

| | | | |
|---|---|---|---|
| 0317079 | 10/1988 | European Pat. Off. | 426/804 |
| 2729370 | 1/1978 | Fed. Rep. of Germany | 426/804 |
| 2-227046 | 9/1990 | Japan . | |

OTHER PUBLICATIONS

*Recommended Dietary Allowances 10th Edition*, National Academy Press, 1989, pp. 44–51.
*Ross Medical Nutritional System Product Handbook*, information on JEVITY ® '89.
*Mead Johnson Enteral Nutritionals Product Handbook*, information on Ultracal TM, '91.
Product brochure for Isosource ® from Sandoz Nutrition, 1991.
"Applications of Soluble Dietary Fiber", *Food Technology*, Jan. 1987, pp. 74–75.
"Fermentability of Various Fiber Sources by Human Fecal Bacteria in Vitro[1-3]", American Journal of Clinical Nutrition, 1991; 53: 1418–24.
*Physiological Effects and Health Consequences of Dietary Fiber*, American Societies for Experimental Biology, Jun. 1987.

*Primary Examiner*—Carolyn Paden
*Attorney, Agent, or Firm*—Lonnie R. Drayer; Donald O. Nickey

[57] ABSTRACT

A liquid nutritional product comprising a fat source and a dietary fiber system. The dietary fiber system as a whole comprises by weight: (a) 5% to 50% dietary fiber which is both soluble and fermentable, 5% to 20% dietary fiber which is both soluble and non-fermentable, and 45% to 80% dietary fiber which is both insoluble and non-fermentable. Less than 10% of the total calories in the product comprise saturated fatty acids, no more than 10% of the total calories in the product comprises polyunsaturated fatty acids, and the ratio of the n-6 to n-3 fatty acids in the product being in the range of 2 to 10. Preferably the dietary fiber which is both soluble and fermentable is gum arabic; the fiber which is both soluble and non-fermentable is sodium carboxymethylcellulose, and the fiber which is both insoluble and non-fermentable is oat hull fiber.

22 Claims, No Drawings

LIQUID NUTRITIONAL PRODUCT

There is provided in accordance with the present invention a fiber-containing, isotonic, nutritionally complete liquid food for total enteral support. Examples of individuals who may require tube feeding are critically ill, chronically disabled, frail, elderly and comatose patients who are unable to chew food, and patients suffering from a diseased or traumatized esophagus who are unable to swallow food.

An objective of the present invention is to provide a liquid nutritional product having a fat level with a fatty acid profile which meets the recommedations contained in *RECOMMENDED DIETARY ALLOWANCES, 10th EDITION* Food and Nutrition Board of the National Research Council, National Academy of Sciences, 1989 for no more than 30% of total calories as fat, less than 10% of calories from saturated fatty acids, no more than 10% from polyunsaturated fatty acids, and a ratio of n-6 to n-3 fatty acids in the range of 2 to 10, most preferably 4 to 10.

Another objective of the present invention is to provide a liquid nutritional product containing both soluble and insoluble, and both fermentable and nonfermentable dietary fiber at a level of about 4 to 5 grams per 8 fluid ounce serving. This level of dietary fiber will meet the recommendations of the U.S. Food and Drug Administration, the U.S. Department of Health and Human Services, and the American Dietetic Association for a minimum daily intake for fiber of 20 to 35 grams per day, if a person is fed five 8 fluid ounce servings of the new product per day.

Another objective of the present invention is to provide a liquid nutritional product which will provide at least 100% of the U.S. Recommended Daily Allowance for vitamins and minerals in a nutrient base of 1,250 calories. This will permit patients with reduced energy requirements to be provided with necessary vitamins and minerals.

In order for a liquid nutritional product according to the invention to meet the limitations that no more than 30% of the total calories are fat, less than 10% of the calories are from saturated fatty acids, no more than 10% of the calories are form polyunsaturated fatty acids, and the ratio of n-6 to n-3 fatty acids is in the range of 2 to 10, preferably 4 to 10, at least one of the fat sources must be a source of alpha-linoleic acid, such as canola oil, soy oil or linseed oil. Preferably, the fat source further comprises a source of oleic acid, preferably a source which comprises over 70% oleic acid such as high oleic safflower oil or high oleic sunflower oil. Most preferably the fat source further comprises medium chain triglycerides (MCT). The following TABLE I contains examples of fat sources, some of which allow a nutritional product according to the invention to meet the above limitations, and some of which do not meet these limitations. The values in Table I unless otherwise noted were calculated using a highly sophisticated computer program having a very high degree of accuracy when verified by actual laboratory analysis. In each instance the fat source as a whole comprises by weight about 3.9% soy lecithin, and the formulation of the remaining 96.1% of the fat source is varied as set forth below. In TABLE I: Blend A is 50% MCT/40% canola oil/10% soy oil which is the same blend as in a commercially available nutritional product for tube feeding having the trade name JEVITY ® and is available from the Ross Laboratories Division of Abbott Laboratories (actual laboratory analysis); Blend B is 50% MCT/50% soy oil which is the same blend as in a commercially available nutritional product for tube feeding having the trade name ULTRACAL ® and is available from Mead-Johnson (taken from product handbook); Blend C is 50% MCT/50% canola oil which is the same blend as in a commercially available nutritional product for tube feeding having the trade name ISOSOURCE ® and is available from Sandoz Nutrition Corp.; Blend D is 100% corn oil; Blend E is 100% canola oil; Blend F is 32.9% soy oil/67.1% high oleic safflower oil; Blend G is 95% high oleic safflower oil/5% linseed oil; and Blend G which is the blend used in the best mode of the invention contemplated at the time of filing a patent application is 50% high oleic safflower oil/30% canola oil/20% MCT.

TABLE I

| | | | | OIL BLENDS | | | | | |
| | | | | | BLEND | | | | |
| | Desired | A | B | C | D | E | F | G | H |
|---|---|---|---|---|---|---|---|---|---|
| Total Calories From Saturated Fatty Acids | <10% | 14.7% | 18.0% | ~15% | 4.17% | 2.08% | 3.03% | 2.47% | 7.69% |
| Total Calories From Polyunsaturated Fatty Acids | ≦10% | 10.32% | 12.5% | 4.9% | 17.88% | 9.25% | 9.95% | 6.38% | 5.69% |
| n-6:n-3 ratio | 2–10 | 37.2 | 5.92 | 2.62 | 56.81 | 2.51 | 9.93 | 5.67 | 5.51 |

Numerous types of dietary fibers are currently available. Basically, dietary fiber passes through the small intesting undigested by enzymes and is a kind of natural and necessary laxative. Dietary fiber is understood to be all of the components of a food that are not broken down by enzymes in the human digestive tract to produce small molecular compounds which are then absorbed into the bloodstream. These components are mostly celluloses, hemicelluloses, pectin, gums, mucilages, lignin and lignin material varying in different plants according to type and age. These fibers differ significantly in their chemical composition and physical structure and subsequently their physiological function. Those skilled in the art have attempted to identify fibers (or fiber systems) which will normalize bowel function, alter glucose absorption, lower serum cholesterol and-/or serve as an indirect energy source for the colon.

There are many publications relating to dietary fiber.

Japanese published patent application Kokai No. Hei 2-227046 published Sept. 10, 1990 teaches the use of dietary fiber, including gum arabic, as embulsifying atents in food products.

U.S. Pat. Nos. 4,565,702 and 4,619,831 teach dietary fiber compositions prepared by coating an insoluble fiber with a soluble fiber.

U.S. Pat. No. 4,834,990 teaches a non-diary liquid food product made by adding dietary fiber and calcium to a fruit juice or a drink.

U.S. Pat. No. 4,959,227 teaches a food product prepared from an aqueous composition containing non-fat milk solids and dietary fiber.

The properties of fibers (or fiber systems) most often related to physiological function are solubility and fermentability. With regard to solubility, fiber can be divided into soluble and insoluble components based on its capacity to be solubilized in a buffer solution at a defined pH. Fiber sources differ in the amount of soluble and insoluble fiber they contain. As used herein and in the claims "soluble" and "insoluble" fiber is determined using American Association of Cereal Chemists (AACC) Method 32-07 and wherein by weight at least 70% of the fiber source comprises total dietary fiber. As used herein and in the claims "total dietary fiber" or "dietary fiber" is understood to be the sum of the soluble and insoluble fiber determined by AACC Method 32-07. As used herein and in the claims a "soluble" dietary fiber source is a fiber source in which at least 60% of the total dietary fiber is soluble fiber as determined by AACC Method 32-07, and an "insoluble" dietary fiber source is a fiber source in which at least 60% of the total dietary fiber is insoluble dietary fiber as determined by AACC Method 32-07. Examples of soluble dietary fiber sources are gum arabic, sodium carboxymethylcellulose, guar gum, citrus pectin, low and high methoxy pectin, barley glucans and psyllium. Examples of insoluble dietary fiber sources are oat hull fiber, pea hull fiber, soy fiber, beet fiber, cellulose, and corn bran.

"Applications of Soluble Dietary Fiber", *FOOD TECHNOLOGY*, January 1987, pages 74–75, teaches that the use of gum arabic and low viscosity grades of carboxymethylcellulose will allow the introduction of soluble dietary fiber into a liquid food, but that: "It is virtually impossible to formulate a good tasting, high fiber drink using insoluble forms of fiber." The dietary fiber system of the present invention succeeds in overcoming this hurdle by providing a unique blend of soluble and insoluble fibers.

A second property of fiber is the capacity to be fermented by the anaerobic bacteria present in the human large bowel. Certain beneficial effects of fiber in the human diet may be mediated by short chain fatty acids (SCFAs) produced during anaerobic fermentation in the colon. Furthermore, it is clear that certain beneficial effects of increased fiber consumption may result from chemical and/or physical properties of the intact fiber (e.g. water holding capacity and absorption of bile acids). Fibers vary significantly in their fermentability. As used herein and in the claims the term "non-fermentable" is understood to refer to dietary fibers which have a relatively low fermentability of less than 40%, preferably less than 30%, and the term "fermentable" is understood to refer to dietary fibers which have a relatively high fermentability of greater than 60%, preferably greater than 70%. Examples of fermentable dietary fiber sources are gum arabic and guar gum. Examples of non-fermentable dietary fiber sources are carboxymethylcellulose (CMC), oat hull fiber and corn bran.

As used herein and in the claims fermentability is determined by the following method, which is also described in Fermentability of various fiber sources by human fecal bacteria in vitro[1-3] at *AMERICAN JOURNAL OF CLINICAL NUTRITION*, 1991; 53: 1418-1424. A healthy human donor serves as a source of fecal material from which an inoculum is prepared. For 8 days before the onset of the experiment, the fecal donor should consume more than 20 g of total dietary fiber per day. This level of consumption may be ensured by consumption of commercial products containing mixtures of soluble and insoluble fibers. An inoculum is prepared from fecal material by mixing 20 g of feces with 180 g an anaerobic dilution solution and then by blending the mixture and filtering it through cheese cloth. The anaerobic dilution solution is prepared as presented below. The inoculum is prepared under carbon dioxide to maintain anaerobiosis.

| ANAEROBIC DILUTION SOLUTION[a] (1 Liter) | |
|---|---|
| INGREDIENT | AMOUNT |
| Mineral solution 1[b] | 37.5 mL |
| Mineral solution 2[c] | 37.5 mL |
| Resazurin solution (.1% w/v)[d] | 1.0 mL |
| NaHCO$_3$ | 6.37 g |
| Distilled H$_2$O (sonicated) | 924.0 mL |
| cysteine HCl.H$_2$O | 0.5 g |

[a]Mix minerals 1 and 2, resazurin and water, saturate with carbon dioxide, and add NaHCO$_3$ and autoclave. Add 0.5 g of cysteine HCl to cooled solution.
[b]K$_2$HPO$_4$, 0.6 g; Na Citrate.2H$_2$O, 0.2 g; d H$_2$O, 100 mL.
[c]NaCl, 1.2 g; (NH$_4$)SO$_4$, 1.2 g; KH$_2$PO$_4$, 0.6 g; CaCl$_2$, 0.12 g; MgSO$_4$.7H$_2$O, 0.25 g; Na Citrate.2H$_2$O, 2 g; d H$_2$O 100 mL; (dissolve salts in H$_2$O in above order).
[d]Resazurin, 0.05 g; d H$_2$O, 50 mL.

An in vitro medium composition is prepared as presented below. One day before the start of the fermentation, all ingredients except cysteine are mixed together, purged with carbon dioxide, autoclaved, capped, and refrigerated. Just before the fermentation, the medium is warmed to 37° C., purged with carbon dioxide, and cysteine added.

| IN VITRO MEDIUM COMPOSITION | |
|---|---|
| INGREDIENT | AMOUNT (%) |
| Volume: volume | |
| Salts A* | 33.0 |
| Salts B | 33.0 |
| Water | 30.61 |
| Vitamin mix | 2.0 |
| Minerals solution § | 1.0 |
| Hemin solution (0.5 g/L) | 0.25 |
| Resazurin solution (1 g/L) | 0.10 |
| SCFA mix ‖ | 0.04 |
| Weight: volume | |
| Yeast extract | 0.05 |
| Trypticase | 0.05 |
| Na$_2$CO$_3$ | 0.40 |
| Cysteine HCl.H$_2$O | 0.05 |

*Composition (g/L): NaCl, 5.4; KH$_2$PO$_4$, 2.7; CaCl$_2$.H$_2$O, 0.16; MgCl.6H$_2$O, 0.12; MnCl$_2$.4H$_2$O, 0.06; CoCl$_2$.6H$_2$O, 0.06; (NH$_4$)$_2$SO$_4$, 5.4.
Composition: 2.7 g K$_2$HPO$_4$/L.
Composition (mg/L): thiamin-HCl, 100; pantothenic acid, 100; niacin, 100; pyridoxine, 100; riboflavin, 100; folic acid. 2.5; biotin, 2.5; para-aminobenzoic acid (PABA), 5; vitamin B-12, 0.25; phylloquinone, 50.
§ Composition (mg/L)L: ethylenediaminetetraacetic acid (EDTA) disodium salt, 500; FeSO$_4$.7H$_2$O, 200; ZnSO$_4$.7H$_2$O, 10; H$_3$PO$_4$, 30; CuCl$_2$.2H$_2$O, 1; NiCl$_2$.6H$_2$O, 2; Na$_2$MoO$_4$.2H$_2$O, 3.
‖ Short-chain fatty acid composition (25% each): N-valeric acid, isovaleric acid, isobutyric acid, DL-2-methylbutyric acid.

The fermentation is conducted by adding 30 mL of the medium and 1 mL of the inoculum to 50-mL centrifuge tubes that are fitted with one-way gas-release valves and should contain 0.31 g of the fiber being evaluated. Additions to the tubes are made under a stream of carbon dioxide. The tubes should be incubated at 37° C.

Fermentation should be stopped after 24 hours by refrigerating the sample. After refrigeration, the sample is mixed with four volumes of 95% ethanol, allowed to precipitate for 1 hour, and then filtered through Dacron (pore size 20-70 μm). The Dacron and residue are dried at 57° C., the residue is scraped into a preweighed vial and, after drying at 57° C., the residue is weighed. It is understood that the residue comprises a mixture of microbial mass and non-fermentable dietary fiber and it is assumed for the purpose of the present invention that if the residue is by weight x% of the starting material, then the starting material comprised at least (100-x)% fermentable dietary fiber.

These properties of fiber solubility and fermentability, are useful in identifying fibers for the treatment and/or prevention of certain conditions. For example, the purpose of the fiber in some nutritional products is to normalize bowel function. As used herein to phrase "normalize bowel function" refers to the treatment and prevention of constipation or diarrhea.

the soluble portion further described as fermentable and non-fermentable. Potential insoluble fibers included pea and/or oat hull fiber while the soluble components could be gum arabic (fermentable) and/or guar gum (fermentable).

The feasibility/optimization work occurred in two main phases using a 1250 kcal nutrient base formulation containing canola oil as 50% of the oil blend. The recipe for the base formulation is presented in TABLE II. The procedure for preparing the base formulation is set forth in the paragraphs immediately following TABLE II. The batches produced during these initial phases of the investigation were of relatively small sizes, for example 25 to 50 pounds. The bill of materials and mixing procedure were developed for a 1,000 pound batch. A person of ordinary skill in the art should have no difficulty in scaling the amounts of the ingredients depending upon the batch size.

TABLE II

| INGREDIENT | TOTAL ADDED PER 1000 LBS FINISHED PRODUCT |
|---|---|
| Canola Oil | 16.7 Pounds |
| High Oleic Safflower Oil | 10.2 Pounds |
| Medium Chain Triglycerides (Fractionated Coconut Oil) | 6.8 Pounds |
| Oil Soluble Vitamin Lecithin | 1.50 Pounds |
| Premix (containing Vitamin A, D, E and K)[1] | 27.3 Grams |
| Calcium Caseinate | 5.91 Pounds |
| Water | 764.8 Pounds |
| Ultra Trace Mineral/Trace Mineral Premix[2] | 109 Grams |
| Potassium Chloride | 0.85 Pounds |
| Potassium Iodide | 0.086 Grams |
| Magnesium Sulfate | 0.707 Pounds |
| Magnesium Chloride | 1.85 Pounds |
| Micronized Tricalcium Phosphate | 2.13 Pounds |
| Hydrolyzed Corn Starch (Dextrose Equivalent 10.0) | 96.7 Pounds |
| Hydrolyzed Corn Starch (Dextrose Equivalent 20.0) | 32.2 Pounds |
| Sodium Caseinate | 38.9 Pounds |
| Potassium Citrate | 1.953 Pounds |
| Sodium Citrate | 1.06 Pounds |
| FIBER VARIED IN EXPERIMENTS | |
| Ascorbic Acid | 242 Grams |
| 45% Potassium Hydroxide | 126 Grams |
| Choline Chloride | 252.5 Grams |
| Carnitine | 80.0 Grams |
| Water Soluble Vitamin Premix[3] | 75.2 Grams |
| Taurine | 70.2 Grams |

[1]Each gram of the premix provides about: 106,400-115,500 IU Vitamin A Palmitate; 5,700-7,500 IU Vitamin D3; 645-825 IU Vitamin E; 1,100-1,600 mg Vitamin $K_1$
[2]Each gram of the premix provides about: 77-88 mg Zinc; 59-67 mg iron; 17-18 mg manganese; 7-8 mg copper; 2-3 mg selenium; 2-3 mg chromium; 5-6 mg molybdenum
[3]Each gram of the premix provides about: 326-424 mg Niacinamide; 211-274 mg d-Calcium Pantothenate; 7-10 mg Folic Acid; 54-70 mg [Thiamine Chloride Hydrochloride]; 42-55 mg Riboflavin; 52-67 mg Pyridoxine Hydrochloride; 138-193 mg Cyanocobalamin; 6-8 mg Biotin

DETAILED DESCRIPTION OF THE INVENTION

At page 161 of a report entitled *PHYSIOLOGICAL EFFECTS AND HEALTH CONSEQUENCES OF DIETARY FIBER*, prepared for the Center For Food Safety and Applied Nutrition, Food and Drug Administration, Department of Health and Human Services, Washington, D.C., U.S. by Life Sciences Research Office, Federation of American Societies For Experimental Biology, Bethesda, Md., U.S., (June 1987) it is estimated that the dietary fiber in a recommended diet would comprise approximately 70-75% insoluble fibers and 25-30% soluble fibers. The report states that this is approximately the ratio found in a diet containing a wide variety of foods. Based upon this published report a decision was made to evaluate the use of a fiber blend having a 75/25 ratio of insoluble and soluble fibers with A protein-in-fat slurry is prepared by placing the canola oil, high oleic safflower oil and medium chain triglycerides oil to a tank and heating the oil blend to a temperature in the range of 140° to 150° F. under agitation. The oil soluble vitamin lecithin is added to the oil blend, and then the vitamin premix is added to the oil blend. The calcium caseinate is added to the oil blend under agitation.

A carbohydrate/mineral slurry is prepared by placing about 124 to 131 lbs of water in a tank and heating the water to a temperature in the range of 145° to 160° F. The ultra trace mineral/trace mineral premix is added to the water and the mixture is agitated for five minutes. Add the potassium chloride, potassium iodide, magnesium phosphate and tricalcium phosphate to the mixture with agitation. Add the hydrolyzed corn starch (dextrose equivalent 10.0) to the mixture and agitate thoroughly. Add the hydrolyzed corn starch (dextrose equivalent 20.0) to the mixture and mix well. Hold the mixture at a temperature in the range of 140° to 160° F.

A protein in water slurry is prepared by placing about 276 lbs of water in a tank and heating it to a temperature in the range of 145° to 155° F. Add the sodium caseinate to the water and agitate the mixture until the sodium caseinate is dissolved. Hold the slurry at a temperature in the range of 140° to 150° F.

Prepare a citrate slurry by placing about 275-282 pounds of water in a kettle and heating the water to a temperature in the range of 140° to 150° F. Add the potassium citrate to the water with agitation. Add the sodium citrate to the mixture. Hold the slurry under agitation at a temperature in the range of 140° to 150° F.

Prepare a blend by first placing the citrate slurry in a blend tank and agitating it well, and then adding the carbohydrate/mineral slurry with agitation. The protein in water slurry is then added to the blend, the protein-in-fat slurry is then added to the blend. During the blending process the various components of the fiber system, which were varied in the experimental protocol were added to the blend.

The pH of each batch was then adjusted to be in the range of 6.75 to 6.85 by adding a sufficient amount of potassium hydroxide to the blend.

PHASE ONE: Insoluble/Soluble Blends with Nutriloid FiberPlus ®

Batches of the base formulation were prepared using pea and/or oat hull fiber as the insoluble fiber fraction while using sodium carboxymethylcellulose (CMC) and Nutriloid FiberPlus ®, which is a proprietary guar gum/gum arabic blend supplied by TIC Gums, Inc. of Belkamp, Md. U.S., as the soluble components. Formulations for these experimental batches are shown in Table II.

Guar gum is a high-molecular weight hydrocolloidal polysaccharide made up mainly of galactan and mannan units combined through glycosidic linkages, which may be described chemically as galactomannan.

Gum arabic, also known as acacia, is an emulsifier, stabilizer and thickener. It is obtained from dried exudates of various acacia trees. Chemically, gum arabic is a heterogenous polysaccharide with slightly acidic characteristics, mainly in the form of its potassium salt.

Sodium carboxymethylcellulose is a white, odorless, tasteless, nontoxic solid, for which the only solvent is water. It is understood that a sodium carboxymethylcellulose used in the practice of the present invention preferably has a viscosity in a 1% solution in wter of not greater than 15 cps. Such a low viscosity CMC is available from TIC Gums, Inc. of Belkamp, Md. U.S.

The oat hull fiber used in the practice of the present invention is understood to comprise ground up oat hulls. Preferably in the practice of this invention the oat hulls have been subjected to a bleaching treatment in a reaction medium comprising an aqueous solution of strong alkali and hydrogen peroxide at a controlled pH in the range of about 11.2 to about 11.8 until substantially all of the polysaccharide in the substrate has been made available as a water soluble fraction, and recovering the water-insoluble polysaccharide fraction from the reaction medium. This method of treatment is taught in U.S. Pat. No. 4,806,475 which is incorporated herein for the purpose of teaching this method.

TABLE III

PHASE ONE FORMULATIONS FIBER SYSTEM

| BATCH | PEA (%) | OAT (%) | FIBERPLUS ® (%) | CMC (%) |
|---|---|---|---|---|
| A1 | 75 | 0 | 20 | 5 |
| A2 | 75 | 0 | 15 | 10 |
| A3 | 0 | 75 | 20 | 5 |
| A4 | 0 | 75 | 15 | 10 |
| B1 | 75 | 0 | 20 | 5 |
| B2 | 75 | 0 | 10 | 15 |
| B3 | 65 | 0 | 20 | 15 |
| B4 | 0 | 75 | 10 | 15 |
| B5 | 85 | 0 | 10 | 5 |
| B6 | 0 | 85 | 10 | 5 |
| B7 | 0 | 65 | 20 | 15 |
| B8 | 0 | 75 | 20 | 5 |
| C1 | 0 | 85 | 10 | 5 |
| C2 | 0 | 65 | 20 | 15 |
| C3 | 65 | 0 | 20 | 15 |
| C4 | 0 | 75 | 20 | 5 |
| C5 | 75 | 0 | 20 | 5 |
| C6 | 0 | 75 | 10 | 15 |
| C7 | 75 | 0 | 10 | 15 |
| C8 | 85 | 0 | 10 | 5 |

Samples from experimental series A1-A4, containing 15% to 20% FiberPlus ®, exhibited gross destabilization (extreme graininess and creaming) and were not subjected to physical stability testing. Samples from series B1-B8 and C1-C8 were prepared with several factors theorized to be significant in the destabilization observed in samples A1-A4 including FiberPlus ®/CMC level, nutrient base, oil blend and insoluble fiber source (pea/oat). Initial visual evaluation of this sample set indicated that samples containing the lower level of FiberPlus ® exhibited a slightly less grainy, but still significant appearance. Additionally, pea fiber was determined to be unacceptable for future consideration as it settled rapidly in samples containing this fiber source. As none of the samples from the series B1-B8 and C1-C8 were judged to be aesthetically acceptable, no physical stability testing was conducted. The visual results were used as a basis for the experimental design of the subsequent Phase Two work.

PHASE TWO: Insoluble/Soluble Blends (Individual Soluble Componets)

As a result of poor stability attributes observed in Phase One material containing Nutriloid FiberPlus ®, two experimental designs were conducted to determine which ingredients were causing problems within the base formula system. It was theorized that the soluble fiber source was among the significant factors influencing physical stability. Two experimental designs were employed to determine which of the soluble fiber sources caused destabilization and if other factor(s) effected stability as well. Products in experimental design number one were manufactured with 5.0 grams of fiber per 8 ounce serving. Of these 5.0 grams, 75% of the fiber blend consisted of oat hull fiber, and the remaining 25% consisted of either 15% gum arabic or guar gum and 10% CMC. All of the fiber components were added individually as opposed to being added as a preblended ingredient such as FiberPlus ®.

Formulations for the batches manufactured during the course of the Phase Two-Design One are presented in Table IV and the test results for these same batches are presented in Table V.

TABLE IV

PHASE TWO-DESIGN ONE FORMULATIONS

FIBER (%)

| BATCH | CMC | GUM ARABIC | GUAR CUM | OAT HULL |
|---|---|---|---|---|
| D1 | 0 | 15 | 10 | 75 |
| D2 | 15 | 15 | 0 | 70 |
| D3 | 0 | 0 | 10 | 90 |
| D4 | 15 | 0 | 10 | 75 |
| D5 | 15 | 0 | 0 | 85 |
| D6 | 0 | 0 | 0 | 100 |
| D7 | 0 | 15 | 0 | 85 |
| D8 | 15 | 15 | 10 | 60 |

TABLE V

PHASE TWO-DESIGN ONE FORMULATIONS

| BATCH | GRAIN | pH | VISCOSITY | AGTRON |
|---|---|---|---|---|
| D1 | 6 | 6.71 | 33.1 | 20.1 |
| D2 | 1 | 6.62 | 19.6 | 41.2 |
| D3 | 1 | 6.62 | 23.6 | 34.0 |
| D4 | 1 | 6.62 | 29.6 | 33.7 |
| D5 | 1 | 6.62 | 19.5 | 41.6 |
| D6 | 1 | 6.62 | 20.3 | 40.4 |
| D7 | 1 | 6.62 | 17.6 | 42.2 |
| D8 | 1 | 6.60 | 33.2 | 36.2 |

Results from the first experimental design (Table V) used to evaluate sample set D1-D8 indicated that destabilization exhibited as increased viscosity and decreased color was caused primarily by the presence of guar gum. This was consistent with Phase One observations in that FiberPlus® contains guar gum. Increasing CMC induces an increase in Agtron rating with only a slight increase in viscosity. Gum arabic increases cause a slight color decrease with a minimal viscosity increase, while guar gum is seen to decrease color about 10 Agton units and increase viscosity more than 10 cps.

In experimental design two insoluble fiber was present as oat hull fiber from D.D. Williamson or Canadian Harvest at a concentration of 75% of the total dietary fiber (TDF) in each batch. These oat hull fibers are essentially the same, although these suppliers is believed to process oat hull fiber in a slightly different manner. In Table IV "FIF/FIW" refer to whether the whether the fiber was added to the product as part of the fat (FIF) blends or in water (FIW) blends.

TABLE VII

PHASE TWO-DESIGN TWO FORMULATIONS

| BATCH | GRAIN | pH | VISCOSITY | AGTRON |
|---|---|---|---|---|
| E1 | 1 | 6.76 | 19.5 | 46.1 |
| E2 | 6 | 6.36 | 34.0 | 41.8 |
| E3 | 1 | 6.74 | 23.3 | 45.9 |
| E4 | 1 | 6.70 | 13.7 | 45.2 |
| E5 | 1 | 6.69 | 16.0 | 44.7 |
| E6 | 1 | 6.48 | 27.6 | 46.0 |
| E7 | 6 | 6.37 | 34.4 | 39.5 |
| E8 | 1 | 6.44 | 20.7 | 47.4 |
| F1 | 1 | 6.64 | 19.6 | 41.2 |
| F2 | 1 | 6.62 | 20.1 | 44.7 |
| F3 | 1 | 6.31 | 25.6 | 45.7 |
| F4 | 3 | 6.41 | 44.4 | 42.8 |
| F5 | 1 | 6.69 | 21.2 | 45.8 |
| F6 | 1 | 6.29 | 26.4 | 46.1 |
| F7 | 1 | 6.72 | 19.8 | 45.5 |
| F8 | 3 | 6.40 | 38.9 | 44.0 |

A repeat of the guar evaluation in the second experimental design confirmed the Design One observation as well as indicating that pH was also a factor in stability (Tables VI & VII). In Tables VI and VII "GRAIN" is a qualitative description of protein stability with 1 being best and 6 being worst (i.e. significant flocculation), and "AGTRON" is a color scale that goes from 1 to 100 with 1 being very dark and 100 being white. Results of the second design indicated maximum stability (lowest viscosity) was obtained at high pH (6.8) when guar gum was eliminated from the formulation. The source of oat hull fiber (Williamson versus Canadian Harvest) appeared to be insignificant in effecting product quality although slight viscosity increases were noted with oat hull fiber from Willismson. Minor increases in color were induced by decreasing potassium levels, changing from FIF to FIW and increasing pH. None of these factors, were viewed to be significant. Successful prototypes were generated during the Phase II work containing 75% oat hull fiber/15% gum arabic/10% CMC represent optimized samples based on original product requirements.

At this point it was concluded that the base formulation containing a blend of oat hull fiber, gum arabic and sodium carboxymethylcellulose appeared to yield optimum physical stability.

In order to further evaluate the use of a fiber system comprising oat hull fiber, gum arabic and sodium carboxymethylcellulose three replicate sample sets were manufactured according to the Bill of Materials set

TABLE VI

PHASE TWO-DESIGN TWO FORMULATIONS

| BATCH | BLEND pH | OAT SOURCE (75% of TDF) | ADDITION FIF/FIW | POTASSIUM IN CHO/MIN | PROCESSING SOLIDS | GUM TYPE (10% OF TDF) |
|---|---|---|---|---|---|---|
| E1 | 6.80 | Williamson | FIW | Current | 24.5% | Guar |
| E2 | 6.40 | Snowite | FIW | 20% Less | 24.5% | Guar |
| E3 | 6.80 | Willimason | FIF | 20% Less | 27.0% | Guar |
| E4 | 6.80 | Snowite | FIF | 20% Less | 24.5% | CMC |
| E5 | 6.80 | Snowite | FIW | Current | 27.0% | CMC |
| E6 | 6.40 | Williamson | FIF | Current | 24.5% | CMC |
| E7 | 6.40 | Snowite | FIF | Current | 27.0% | CMC |
| E8 | 6.40 | Williamson | FIW | 20% Less | 27.0% | CMC |
| F1 | 6.80 | Snowite | FIF | Current | 24.5% | Guar |
| F2 | 6.80 | Snowite | FIW | 20% Less | 27.0% | Guar |
| F3 | 6.40 | Snowite | FIW | Current | 24.5% | CMC |
| F4 | 6.40 | Williamson | FIW | Current | 27.0% | Guar |
| F5 | 6.80 | Williamson | FIF | 20% Less | 24.5% | CMC |
| F6 | 6.40 | Snowite | FIF | 20% Less | 27.0% | CMC |
| F7 | 6.80 | Williamson | FIF | Current | 27.0% | CMC |
| F8 | 6.40 | Williamson | FIF | 20% Less | 24.5% | Guar | forth in TABLE VIII using the method set forth in the paragraphs which immediately follow TABLE VIII.

TABLE VIII

| INGREDIENT | TOTAL ADDED PER 1000 LBS FINISHED PRODUCT |
|---|---|
| Canola Oil | 10.4 Pounds |
| High Oleic Safflower Oil | 17.4 Pounds |
| Medium Chain Triglycerides (Fractionated Coconut Oil) | 7.0 Pounds |
| Oil Soluble Vitamin Lecithin | 1.50 Pounds |
| Premix (containing Vitamin A, D, E and K)[1] | 27.2 Grams |
| Calcium Caseinate | 6.07 Pounds |
| Water | 764.8 Pounds |
| Ultra Trace Mineral/Trace Mineral Premix[2] | 109 Grams |
| Potassium Chloride | 0.85 Pounds |
| Potassium Iodide | 0.086 Grams |
| Magnesium Phosphate | 2.1 Pounds |
| Micronized Tricalcium Phosphate | 2.13 Pounds |
| Hydrolyzed Corn Starch (Dextrose Equivalent 10.0) | 96.7 Pounds |
| Hydrolyzed Corn Starch (Dextrose Equivalent 20.0) | 32.2 Pounds |
| Sodium Caseinate | 38.9 Pounds |
| Potassium Citrate | 1.953 Pounds |
| Sodium Citrate | 1.06 Pounds |
| Gum Arabic | VARIED IN EXPERIMENTS |
| Oat Hull Fiber | VARIED IN EXPERIMENTS |
| Sodium Carboxymethylcellulose | VARIED IN EXPERIMENTS |
| Ascorbic Acid | 242.2 Grams |
| 45% Potassium Hydroxide | 126 Grams |
| Choline Chloride | 252.5 Grams |
| Carnitine | 80.0 Grams |
| Water Soluble Vitamin Premix[3] | 37.5 Grams |
| Taurine | 70.2 Grams |

[1] Each gram of the premix provides about: 106,400–115,500 IU Vitamin A Palmitate; 5,700–7,500 IU Vitamin D3; 645–825 IU Vitamin E; 1,100–1,600 mg Vitamin $K_1$
[2] Each gram of the premix provides about: 77–88 mg Zinc; 59–67 mg iron; 17–18 mg manganese; 7–8 mg copper; 2–3 mg selenium; 2–3 mg chromium; 5–6 mg molybdenum
[3] Each gram of the premix provides about: 326–424 mg Niacinamide; 211–274 mg d-Calcium Pantothenate; 7–10 mg Folic Acid; 54–70 mg [Thiamine Chloride Hydrochloride]; 42–55 mg Riboflavin; 52–67 mg Pyridoxine Hydrochloride; 138–193 mg Cyanocobalamin; 6–8 mg Biotin A protein-in-fat slurry is prepared by placing the canola oil, high oleic safflower oil and medium chain triglycerides oil in a tank and heating the oil blend to a temperature in the range of 140° to b 150° F. under agitation. The oil soluble vitamin lecithin is added to the oil blend, and then the vitamin premix is added to the oil blend. The calcium caseinate is added to the oil blend under agitation.

A carbohydrate/mineral slurry is prepared by placing about 124 to 131 lbs of water in a tank and heating the water to a temperature in the range of 145° to 160° F. The ultra trace mineral/trace mineral premix is added to the water and the mixture is agitated for five minutes. Add the potassium chloride, potassium iodide, magnesium phosphate and micronized tricalcium phosphate to the mixture with agitation. Add the hydrolyzed corn starch (dextrose equivalent 10.0) to the mixture and agitate thoroughly. Add the hydrolyzed corn starch (dextrose equivalent 20.0) to the mixture and mix well. Hold the mixture at a temperature in the range of 140° to 160° F.

A protein-in-water slurry is prepared by placing about 276 lbs of water in a tank and heating it to a temperature in the range of 145° to 155° F. Add the sodium caseinate to the water and agitate the mixture until the sodium caseinate is dissolved. Hold the slurry at a temperature in the range of 140° to 150° F.

Prepare a citrate slurry by placing about 275 to 282 lbs of water in a kettle and heating the water to a temperature in the range of 140° to 150° F. Add the potassium citrate to the water with agitation. Add the sodium citrate to the mixture. Hold the slurry under agitation at a temperature in the range of 140° to 150° F.

A blend is prepared by first placing the citrate slurry in a blend tank and agitating it well. Add the gum arabic to the citrate slurry with agitation. The gum arabic will not readily go into solution and may take a few minutes to completely dissolved. It is necessary to maintain rapid agitation and assure that the gum arabic is dissolved before continuing. The oat hull fiber is then added to the blend under agitation. The carbohydrate/mineral slurry is then added to the blend with agitation. The protein-in-water slurry is then added to the blend. Place all of the protein-in-fat slurry in a container and add the sodium carboxymethylcellulose to it with agitation. Rinse the container with some of the blend to insure proper transfer. Add the protein-in-fat slurry to the blend, and rinse the container with some of the blend to insure proper transfer.

Use 1N potassium hydroxide to adjust the pH of the blend to be in the range of 6.75 to 6.85. Maintain the temperature of the blend in the range of 140° to 150° F. for a maximum of 2 hours before heat treatment and homogenization.

The blend is subjected to Ultra High Temperature Short Time (UHTST) heat treatment and homogenization by the following procedure. The blend is preheated to a temperature in the range of 155° to 165° F. and then deaerated at 10 to 15 inches Hg. The blend is then emulsified at 900–1,000 psig. The blend is then heated to a temperature in the range of 229° to 231° F. and held at this temperature for a minimum of 10 seconds. The blend is then UHTST heat treated to a temperature of 292° to 294° F. with a minimum hold time of 5 seconds. If desired, the blend could instead be subjected to High Temperature Short Time heat treatment without adversely affecting product stability, as demonstrated in TABLE VIII. The blend is then passed through a flash cooler to reduce the temperature of the blend to 248° to 252° F. The blend is then passed through a plate cooler to reduce the temperature of the blend to 160° to 170° F. The blend is then homogenized at 3,900–4,100/400–600 psig. The homogenized blend is held at a temperature of 165° to 175° F. for a minimum of 16 seconds. The blend is cooled to 34° to 44° F.

Prepare an ascorbic acid solution by adding to about 8 pounds of water the following ingredients; ascorbic acid, choline chloride, carnitine, 45% potassium hydroxide. Adjust the pH of this solution to be in the ring of 6.0–10.0 using additional 45% potassium hydroxide. Add the ascorbic acid solution to the blend and mix thoroughly.

Prepare a vitamin/taurine solution by dissolving in about 4.4 pounds of water the water soluble vitamin premix and taurine. Add this solution to the blend.

Dilute the blend with the necessary amount of water to bring the percentage of total solid content, fat and protein to be within the desired ranges. Place the blend in suitable containers and then sterilize the product. Three sets of replicate sample batches were prepared using the recipe presented in TABLE VII using the foregoing manufacturing procedure, with any variations being footnoted in the following TABLES IX, X and XI.

TABLE IX

FIBER RATIOS (% OF TOTAL DIETARY FIBER BY WEIGHT) FOR FIRST SET OF REPLICATE BATCHES

| | FIBER BLEND | | |
|---|---|---|---|
| BATCH | OAT FIBER | GUM ARABIC | CMC |
| G1 | 80% CANADIAN HARVEST | 10% | 10% |
| G2 | 80% WILLIAMSON | 10% | 10% |
| G3 | 75% CANADIAN HARVEST | 17.5% | 7.5% |
| G4 | 75% WILLIAMSON | 17.5% | 7.5% |
| G5 | 70% CANADIAN HARVEST | 10% | 20% |
| G6 | 70% WILLIAMSON | 10% | 20% |
| G7* | 70% CANADIAN HARVEST | 20% | 10% |
| G8* | 70% WILLIAMSON | 20% | 10% |

*BATCHES UHT'ED as set forth above, ALL OTHER BATCHES WERE PROCESSED VIA HIGH TEMPERATURE SHORT TIME (HTST) STANDARD PASTEURIZATION AT 165° to 175° F. FOR 16 SECONDS

TABLE X

FIBER RATIOS (% OF TOTAL DIETARY FIBER BY WEIGHT) FOR SECOND SET OF REPLICATE BATCHES (ALL BATCHES PROCESSED VIA UHT AS DESCRIBED ABOVE)

| | | FIBER RATIOS | |
|---|---|---|---|
| BATCH | OAT FIBER | GUM ARABIC | CMC |
| H1 | 80% CANADIAN HARVEST | 10% | 10% |
| H2 | 80% WILLIAMSON | 10% | 10% |
| H3 | 75% CANADIAN HARVEST | 17.5% | 7.5% |
| H4 | 75% WILLIAMSON | 17.5% | 7.5% |
| H5 | 70% CANADIAN HARVEST | 10% | 20% |
| H6 | 70% WILLIAMSON | 10% | 20% |
| H7 | 70% CANADIAN HARVEST | 20% | 10% |
| H8 | 70% WILLIAMSON | 20% | 10% |

TABLE XI

FIBER RATIOS (% OF TOTAL DIETARY FIBER BY WEIGHT) FOR THIRD SET OF REPLICATE BATCHES (ALL BATCHES PROCESSED VIA UHT AS DESCRIBED ABOVE)

| | | FIBER RATIO | |
|---|---|---|---|
| BATCH | OAT FIBER | GUM ARABIC | CMC |
| J1 | 80% CANADIAN HARVEST | 10% | 10% |
| J2 | 80% WILLIAMSON | 10% | 10% |
| J3 | 75% CANADIAN HARVEST | 17.5% | 7.5% |
| J4 | 75% WILLIAMSON | 17.5% | 7.5% |
| J5 | 75% CANADIAN HARVEST | 20% | 5% |
| J6 | 75% WILLIAMSON | 20% | 5% |
| J7 | 70% CANADIAN HARVEST | 20% | 10% |
| J8 | 70% WILLIAMSON | 20% | 10% |

For each of the replicate batches a portion of the batch was packaged in 8 ounce metal cans (labeled as "M" in Table XII) and a portion of the batch was packaged in one liter plastic containers (labeled as "P: in Table XII).

As indicated in Table XI the physical stability of the retorted batches varies depending upon the levels of fibers present. In general, batches containing various levels of soluble fiber (CMC and gum arabid) exhibited similar viscosities as long as the CMC content did not exceed 10% by weight of the fiber system. Physical stability was not tested for variations 4 and 5 of replicate sets G and H due to the presence of gross destabilization believed to have been caused by the high level (20%) of CMC. Batches containing 7.5% CMC exhibited slightly lower viscosities than samples containing 10% CMC, due to CMC acting as a "gum" or stabilizer which influences visocisity based on concentration. As gum arabic imparts very little viscosity, variations in gum arabic concentration were not observed to significantly effect replicate sample visocisity. Viscosities of all replicate batches were observed to range from 20 to 35 cps which is satisfactory for both oral intake and tube feeding. Container type was not observed to cause significant product differences.

Several batches (e.g. G1, J1, J7) containing oat hull fiber from Canadian Harvest exhibited poorer stability (high grain/draker color) when compared to an equivalent formulation containing oat hull fiber from Williamson. The reason for this variation between the suppliers is not known. Therefore, it is preferred that oat hull fiber from Williamson, (their stock number 782 with a brand name of "BETTER BASICS") be used in the practive of a preferred embodiment of this invention.

TABLE XII

4 DAY PHYSICAL STABILITY DATA FOR REPLICATE BATCHES

| BATCH | pH | VISCOSITY (cps) | GRAIN | AGTRON | OSMOLALITY (MOSM/Kg WATER) |
|---|---|---|---|---|---|
| G1-M | 6.74 | 23.3 | 6 | 39.2 | |

TABLE XII-continued

4 DAY PHYSICAL STABILITY DATA FOR REPLICATE BATCHES

| BATCH | pH | VISCOSITY (cps) | GRAIN | AGTRON | OSMOLALITY (MOSM/Kg WATER) |
|---|---|---|---|---|---|
| G1-P | 6.71 | 21.8 | 6 | 37.6 | 310 |
| G2-M | 6.74 | 26.0 | 1 | 40.5 | 314 |
| G2-P | 6.71 | 25.7 | 1 | 40.7 | 311 |
| G3-M | 6.76 | 20.5 | 1 | 41.7 | 306 |
| G3-P | 6.71 | 19.5 | 1 | 40.8 | 301 |
| G4-M | 6.74 | 22.7 | 1 | 43.6 | |
| G4-P | 6.69 | 22.3 | 1 | 42.8 | 306 |
| G7-M | 6.74 | 25.8 | 1 | 39.7 | 301 |
| G7-P | 6.69 | 26.3 | 6 | 37.9 | 300 |
| G8-M | 6.76 | 26.3 | 1 | 41.7 | |
| G8-P | 6.71 | 25.8 | 1 | 39.2 | 308 |
| H1-M | 6.70 | 26.2 | 1 | 37.6 | |
| H1-P | 6.65 | 29.9 | 1 | 37.6 | 295 |
| H2-M | 6.72 | 30.9 | 1 | 40.7 | |
| H2-P | 6.67 | 30.1 | 1 | 38.3 | 308 |
| H3-M | 6.70 | 21.9 | 1 | 39.1 | |
| H3-P | 6.67 | 21.7 | 1 | 38.1 | 292 |
| H4-M | 6.72 | 27.4 | 1 | 41.3 | 301 |
| H4-P | 6.65 | 25.9 | 1 | 38.7 | 304 |
| H7-M | 6.70 | 28.6 | 1 | 38.5 | |
| H7-P | 6.65 | 32.6 | 1 | 35.9 | 306 |
| H8-M | 6.70 | 28.6 | 1 | 41.5 | 307 |
| H8-P | 6.67 | 28.9 | 1 | 38.9 | 307 |
| J1-M | 6.83 | 36.2 | 6 | 33.6 | |
| J1-P | 6.79 | 42.5 | 6 | 32.7 | |
| J2-M | 6.84 | 30.4 | 1 | 38.6 | |
| J2-P | 6.79 | 27.7 | 1 | 36.7 | 297 |
| J3-M | 6.84 | 22.6 | 1 | 38.4 | |
| J3-P | 6.77 | 21.4 | 1 | 36.7 | 294 |
| J4-M | 6.82 | 27.5 | 1 | 39.2 | |
| J4-P | 6.77 | 23.9 | 1 | 37.4 | 292 |
| J5-M | 6.81 | 19.4 | 1 | 39.5 | |
| J5-P | 6.77 | 17.4 | 1 | 38.6 | 297 |
| J6-M | 6.84 | 23.9 | 1 | 40.1 | |
| J6-P | 6.77 | 20.3 | 1 | 37.4 | 304 |
| J7-M | 6.82 | 31.4 | 6 | 35.1 | |
| J7-P | 6.77 | 49.5 | 6 | 37.3 | |
| J8-M | 6.81 | 29.2 | 1 | 39.1 | |
| J8-P | 6.76 | 27.0 | 1 | 37.2 | 300 |

TABLE XIII

0-TIME COMPOSITION DATA FOR REPLICATE BATCHES

| | TOTAL SOLIDS (g/100 g) | FAT (g/100 g) | PROTEIN (g/100 g) | MINERALS (mg/100 g) | | |
|---|---|---|---|---|---|---|
| | | | | Ca | Na | K |
| LIMITS(s) | 22.30–22.70 | 3.46–3.62 | 4.13–4.33 | 84.8–98.8 | 77.9–95.3 | 131–159 |
| BATCH | | | | | | |
| G1-C | 22.71 | 3.63 | 4.36 | 88.1 | 101 | 144 |
| G2-C | 22.71 | 3.65 | 4.34 | 88.4 | 119 | 136 |
| G3-C | 22.80 | 3.65 | 4.32 | 87.0 | 97.4 | 144 |
| G4-C | 22.61 | 3.51 | 4.33 | 90.6 | 112 | 134 |
| G7-C | 22.41 | 3.58 | 4.43 | 91.0 | 101 | 145 |
| G8-C | 22.55 | 3.65 | 4.33 | 91.5 | 113 | 137 |
| H1-C | 22.46 | 3.67 | 4.38 | 97.8 | 98.8 | 141 |
| H2-C | 22.68 | 3.67 | 4.41 | 92.6 | 108 | 129 |
| H3-C | 22.6 | 3.75 | 4.46 | 88.3 | 95.5 | 138 |
| H4-C | 22.46 | 3.60 | 4.42 | 92.8 | 105 | 133 |
| H7-C | 22.48 | 3.61 | 4.36 | 90.4 | 99.6 | 141 |
| H8-C | 22.56 | 3.60 | 4.43 | 91.3 | 108 | 132 |
| J1-C | 22.61 | 3.50 | 4.20 | 97.0 | 101 | 150 |
| J2-C | 22.64 | 3.54 | 4.15 | 92.0 | 104 | 152 |
| J3-C | 22.83 | 3.58 | 4.26 | 90.5 | 96.0 | 153 |
| J4-C | 22.66 | 3.49 | 4.21 | 92.9 | 97.3 | 150 |
| J5-C | 22.84 | 3.59 | 4.27 | 91.5 | 93.4 | 154 |
| J6-C | 22.60 | 3.57 | 4.17 | 95.7 | 97.2 | 153 |
| J7-C | 22.49 | 3.60 | 4.18 | 95.7 | 101 | 154 |
| J8-C | 22.50 | 3.51 | 4.18 | 93.3 | 100 | 147 |

| | | MINERALS (mg/100 g) | | | VITAMINS (iu/l) | | DENSITY (g/ml) |
|---|---|---|---|---|---|---|---|
| | | Mg | P | Zn | A | E | |
| | LIMIT(s) | 28.1–32.6 | 70.5–84.6 | 1.98 | 4718 | 42.5 | |
| | BATCH | | | | | | |
| | G1-C | 33.2 | 109 | 2.03 | | | |
| | G2-C | 34.2 | 122 | 2.04 | | | |
| | G3-C | 33.7 | 108 | 2.00 | | | |
| | G4-C | 33.9 | 117 | 2.02 | 6360 | 47.1 | 1.068 |

TABLE XIII-continued
0-TIME COMPOSITION DATA FOR REPLICATE BATCHES

| | | | | | | |
|---|---|---|---|---|---|---|
| G7-C | 33.8 | 111 | 2.05 | | | |
| G8-C | 34.3 | 118 | 2.09 | 5400 | 44.6 | 1.069 |
| H1-C | 34.4 | 114 | 2.17 | | | |
| H2-C | 34.0 | 115 | 2.11 | | | |
| H3-C | 33.1 | 107 | 2.07 | | | |
| H4-C | 33.4 | 115 | 2.12 | 5200 | 43.7 | |
| H7-C | 33.2 | 107 | 2.09 | | | |
| H8-C | 33.8 | 114 | 2.08 | 5820 | 45.4 | |
| J1-C | 38.6 | 118 | 2.43 | | | |
| J2-C | 32.5 | 110 | 2.06 | | | |
| J3-C | 32.6 | 107 | 2.03 | | | |
| J4-C | 32.3 | 109 | 2.03 | 4940 | 43.4 | 1.0685 |
| J5-C | 33.1 | 107 | 2.04 | | | |
| J6-C | 33.4 | 114 | 2.08 | | | |
| J7-C | 33.4 | 110 | 2.08 | | | |
| J8-C | 32.4 | 109 | 2.03 | 4950 | 43.4 | 1.0715 |

As a result of the foregoing it was concluded that a liquid nutritional product according to the invention should have a dietary fiber system comprising be weight wherein: (a) 5% to 50% dietary fiber which is both soluble and fermentable, 5% to 20% dietary fiber which is both soluble and non-fermentable, and 45% to 80% dietary fiber which is both insoluble and non-fermentable; and preferably wherein the dietary fiber which is both soluble and fermentable is gum arabic; the fiber which is both soluble and non-fermentable is sodium carboxymethylcellulose, and the fiber which is both insoluble and non-fermentable is oat hull fiber. In the best mode contemplated at the time of filing a patent application the fiber system comprises by weight about 75% oat hull fiber, about 17.5% gum arabic and about 7.5% sodium carboxymethylcellulose. This dietary fiber system is the subject of commonly owned U.S. patent application Ser. No. 07/722,437 filed on June 27, 1991.

A liquid nutritional product in accordance with the present invention comprises a dietary fiber system in combination with a fat source, such that less than 10% of the total calories in said product comprise saturated fatty acids, no more than 10% of the total calories in said product comprise polyunsaturated fatty acids, and the ratio of the n-6 to n-3 fatty acids in said product is in the range of 2 to 10. In a most preferred embodiment of the invention a liquid nutritional product contains a fat source comprising by weight a blend of about 3.9% soy lecithin and about 96.1% of an oil blend which comprises by weight about 30% canola oil, about 50% high oleic safflower oil, and about 20% medium chain triglycerides, along with a dietary fiber system comprising by weight about 15% to 20% gum arabic, about 70% to about 80% oat hull fiber, and about 5% to about 10% sodium carboxymethylcellulose. The preferred, and most preferred, values of properties such as total calories, caloric distribution, viscosity, osmolality, and so forth in an 8 ounce serving of the liquid nutritional product of the invention are set forth in TABLE XV.

A Bill of Materials for manufacturing a 1,000 pound batch of a liquid nutritional product according to the best mode is presented in TABLE XIV and the nutritional profile of an 8 fluid ounce serving of a product according to the invention is set forth in TABLE XV. The product according to the best mode may be manufactured using the method set forth above immediately following TABLE VIII.

TABLE XIV

| INGREDIENT | TOTAL ADDED PER 1000 LBS FINISHED PRODUCT |
|---|---|
| Canola Oil | 10.4 Pounds |
| High Oleic Safflower Oil | 17.3 Pounds |
| Medium Chain Triglycerides (Fractionated Coconut Oil) | 6.9 Pounds |
| Oil Soluble Vitamin Lecithin | 1.50 Pounds |
| Premix (containing Vitamin A, D, E and K)[1] | 27.3 Grams |
| Calcium Caseinate | 5.91 Pounds |
| Water | 764.8 Pounds |
| Ultra Trace Mineral/Trace Mineral Premix[2] | 109 Grams |
| Potassium Chloride | 0.85 Pounds |
| Potassium Iodide | 0.086 Grams |
| Magnesium Sulfate | 0.707 Pounds |
| Magnesium Chloride | 1.85 Pounds |
| Micronized Tricalcium Phosphate | 2.13 Pounds |
| Hydrolyzed Corn Starch (Dextrose Equivalent 10.0) | 96 Pounds |
| Hydrolyzed Corn Starch (Dextrose Equivalent 20.0) | 32 Pounds |
| Sodium Caseinate | 38.9 Pounds |
| Potassium Citrate | 1.953 Pounds |
| Sodium Citrate | 1.06 Pounds |
| Gum Arabic | 3.44 Pounds |
| Oat Hull Fiber | 13.6 Pounds |
| Sodium Carboxymethylcellulose | 1.45 Pounds |
| Ascorbic Acid | 242 Grams |
| 45% Potassium Hydroxide | 126 Grams |
| Choline Chloride | 252.5 Grams |
| Carnitine | 80.0 Grams |

TABLE XIV-continued

| INGREDIENT | TOTAL ADDED PER 1000 LBS FINISHED PRODUCT |
|---|---|
| Water Soluble Vitamin Premix[3] | 75.2 Grams |
| Taurine | 70.2 Grams |

[1] Each gram of the premix provides about: 106,400–115,500 IU Vitamin A Palmitate; 5,700–7,500 IU Vitamin D3; 645–825 IU Vitamin E; 1,100–1,600 mg Vitamin $K_1$
[2] Each gram of the premix provides about: 77–88 mg Zinc; 59–67 mg iron; 17–18 mg manganese; 7–8 mg copper; 2–3 mg selenium; 2–3 mg chromium; 5–6 mg molybdenum
[3] Each gram of the premix provides about: 326–424 mg Niacinamide; 211–274 mg d-Calcium Pantothenate; 7–10 mg Folic Acid; 54–70 mg [Thiamine Chloride Hydrochloride]; 42–55 mg Riboflavin; 52–67 mg Pyridoxine Hydrochloride; 138–193 mg Cyanocobalamin; 6–8 mg Biotin

TABLE XV

| NUTRIENTS/ PROPERTIES | PREFERRED RANGE | MOST PREFERRED RANGE Per 8 oz Serving |
|---|---|---|
| Protein, g | 8.2–22.2 | 10.5–11.0 |
| Fat, g | 5.3–14.1 | 8.0–8.8 |
| Carbohydrate, g (excluding fiber) | 26.3–53.3 | 34.7–38.2 |
| Total Dietary Fiber, g | 3–5 | 4–4.4 |
| Vitamin A, IU | | 1000–1500 |
| Vitamin D, IU | | 80–120 |
| Vitamin E, IU | | 9–13.5 |
| Vitamin K1, mcg | | 16–24 |
| Vitamin C, mg | | 60–150 |
| Folic Acid, mcg | | 120–180 |
| Thiamine (Vit B1), mg | | 0.45–0.68 |
| Riboflavin, (Vit B2), mg | | 0.51–0.77 |
| Vitamin B6, mg | | 0.6–0.9 |
| Vitamin B12, mcg | | 1.8–2.7 |
| Niacin, mg | | 6–9 |
| Choline, mg | | 120–180 |
| Biotin, mcg | | 90–135 |
| Pantothenic Acid, mg | | 3–4.5 |
| Sodium, mg | | 176–294 |
| Potassium, mg | | 300–500 |
| Chloride, mg | | 247.5–412.5 |
| Calcium, mg | | 240–300 |
| Phosphorus, mg | 240–300 | |
| Magnesium, mg | | 80–100 |
| Iodine, mcg | | 30–37.5 |
| Manganese, mg | | 1–1.25 |
| Copper, mg | | 0.4–0.5 |
| Zinc, mg | | 4.5–5.6 |
| Iron, mg | | 3.6–4.5 |
| Selenium, mcg | | 14–17.5 |
| Chromium, mcg | | 20–25 |
| Molybdenum, mcg | | 30–37.5 |
| Carnitine, mg | | 30–37.5 |
| Taurine, mg | | 30–37.5 |
| Osmolality, mosm/kg | 290–380 | 300–310 |
| Kilocalories | 237–355 | 245–255 |
| Viscosity | <100 | <100 |

While certain representative embodiments and details have been described for the purpose of illustrating the invention, it will be apparent to those skilled in the art that various changes and modifications may be made therein without departing from the spirit or scope of the invention.

We claim:

1. A liquid nutritional product comprising a fat source and a dietary fiber system, the fiber system as a whole comprising by weight: (a) 5% to 50% dietary fiber which is both soluble and fermentable, 5% to 20% dietary fiber which is both soluble and non-fermentable, and 45% to 80% dietary fiber which is both insoluble and non-fermentable; less than 10% of the total calories in said product comprising saturated fatty acids, no more than 10% of the total calories in said product comprising polyunsaturated fatty acids, and the ratio of the n-6 to n-3 fatty acids in said product being in the range of 2 to 10.

2. A liquid nutritional product according to claim 1 wherein the dietary fiber which is both soluble and fermentable is gum arabic; the fiber which is both soluble and non-fermentable is sodium carboxymethylcellulose, and the fiber which is both insoluble and non-fermentable is oat hull fiber.

3. A liquid nutritional product according to claim 2 wherein the fat source comprises at least one material selected from the group consisting of canola oil, soy oil, and linseed oil.

4. A liquid nutritional product according to claim 3 wherein the fat source further comprises a material selected from the group consisting of high oleic safflower oil and high oleic sunflower oil.

5. A liquid nutritional product according to claim 4 wherein the fat source further comprises medium chain triglycerides.

6. A liquid nutritional product according to claim 5 wherein the fat source further comprises medium chain triglycerides.

7. A liquid nutritional product according to claim 6 wherein the dietary fiber system comprises by weight about 15% to 20% gum arabic, about 70% to 80% oat hull fiber and about 5% to 10% sodium carboxymethylcellulose.

8. A liquid nutritional product according to claim 5 wherein the dietary fiber system comprises by weight about 15% to 20% gum arabic, about 70% to 80% oat hull fiber and about 5% to 10% sodium carboxymethylcellulose.

9. A liquid nutritional product according to claim 3 wherein the fat source further comprises medium chain triglycerides.

10. A liquid nutritional product according to claim 1 wherein the fat source comprises at least one material selected from the group consisting of canola oil, soy oil, and linseed oil.

11. A liquid nutritional product according to claim 10 wherein the fat source further comprises a material selected from the group consisting of high oleic safflower oil and high oleic sunflower oil.

12. A liquid nutritional product according to claim 11 wherein the fat source further comprises medium chain triglycerides.

13. A liquid nutritional product according to claim 10 wherein the fat source further comprises medium chain triglycerides.

14. A liquid nutritional product comprising a fat source and a dietary fiber system wherein the fat source comprises at least one material selected from the group consisting of canola oil, soy oil and linseed oil, said dietary fiber system comprising gum arabic, oat hull fiber and sodium carboxymethylcellulose, less than 10% of the total calories in said product comprising saturated fatty acids, no more than 10% of the total calories in said product comprising polyunsaturated fatty acids, and the ration of n-6 to n-3 fatty acids in said product being in the range of 2 to 10.

15. A liquid nutritional product wherein the product contains a fat source comprising by weight a blend of about 3.9% soy lecithin and about 96.1% of an oil blend which comprises by weight about 30% canola oil, about 50% high oleic safflower oil, and about 20% medium chain triglycerides, and a dietary fiber system comprising by weight about 15% to about 20% gum arabic, about 70% to about 80% oat hull fiber, and about 5% to about 10% sodium carboxymethylcellulose, less than 10% of the total calories in said product comprising saturated fatty acids, no more than 10% of the total calories in said product comprising polyunsaturated fatty acids, and the ratio of n-6 to n-3 fatty acids in said product being in the range of 4 to 10.

16. A liquid nutritional product according to claim 15 wherein the caloric profile of the product is about 14% to 25% protein, about 20% to about 35% fat, and about 45% to about 60% carbohydrate.

17. A liquid nutritional product according to claim 15 wherein an 8 fluid ounce serving of the product contains about 237 to about 355 Kilocalories.

18. A liquid nutritional product according to claim 15 wherein the product has a viscosity of not greater than about 100 cps.

19. A liquid nutritional product according to claim 15 wherein the product has an osmolality in the range of about 290 mosm/kg to about 380 mosm/kg.

20. A liquid nutritional product according to claim 15 wherein an 8 fluid ounce serving of the product further comprises about 8.2 grams to about 22.2 grams of protein.

21. A liquid nutritional product according to claim 15 wherein an 8 fluid ounce serving of the product further comprises about 26.6 grams to about 53.3 grams of carbohydrate.

22. A liquid nutritional product according to claim 15 wherein an 8 fluid ounce serving of the product further comprises about 5.3 grams to about 14.1 grams of fat.

* * * * *

UNITED STATES PATENT AND TRADEMARK OFFICE
CERTIFICATE OF CORRECTION

PATENT NO. : 5,104,677

DATED : April 14, 1992

INVENTOR(S) : Stephen R. Behr, Lisa D. Craig, Keith A. Garleb, Cynthia S. Neal, James N. Chmura, Paul Anloague, Mary B. Cunningham, David C. Sertl It is certified that error appears in the above-identified patent and that said Letters Patent is hereby corrected as shown below:

Column 2, line 46, "intesting" should be --intestine--
Column 2, line 64, "embulsifying" should be --emulsifying--
Column 2, line 65, "atents" should be --agents--
Column 3, line 1, "non-diary" should be --non-dairy--
Column 7, line 53, "wter" should be --water--
Column 8, line 46, "Componets" should be --Components--
Column 9, line 41, "is" should be --are--
Column 11, line 41, delete "b"
Column 13, line 9, "F." should be --F--
Column 13, line 14, "ring" should be --range--
Column 14, line 37, "arabid" should be --arabic--
Column 14, line 56, "draker" should be --darker--
Column 17, line 21, "be" should be --by--

Signed and Sealed this

Twentieth Day of July, 1993

Attest:

MICHAEL K. KIRK

Attesting Officer

Acting Commissioner of Patents and Trademarks